(12) United States Patent
Xu et al.

(10) Patent No.: US 10,768,287 B2
(45) Date of Patent: Sep. 8, 2020

(54) BUOY-TYPE HIGH FREQUENCY GROUND-WAVE RADAR SYSTEM

(71) Applicant: CHINA PRECISE OCEAN DETECTION TECHNOLOGY CO., LTD, Yichang (Hubei Province) (CN)

(72) Inventors: Jiaqin Xu, Yichang (CN); Jun Cao, Yichang (CN); Zhihui Chen, Yichang (CN); Xiongbin Wu, Yichang (CN); Keyong Qiu, Yichang (CN); Yuanyuan Chen, Yichang (CN); Guosheng Song, Yichang (CN); Xiu Li, Yichang (CN); Peng Wang, Yichang (CN); Jie Li, Yichang (CN)

(73) Assignee: CHINA PRECISE OCEAN DETECTION TECHNOLOGY CO., LTD, Yichang (Hubei Province) (CN)

( * ) Notice: Subject to any disclaimer, the term of this patent is extended or adjusted under 35 U.S.C. 154(b) by 260 days.

(21) Appl. No.: 15/916,272

(22) Filed: Mar. 8, 2018

(65) Prior Publication Data
US 2018/0196132 A1   Jul. 12, 2018

Related U.S. Application Data

(63) Continuation of application No. PCT/CN2016/000307, filed on Jun. 16, 2016.

(30) Foreign Application Priority Data

Sep. 9, 2015  (CN) .......................... 2015 1 0568167

(51) Int. Cl.
*G01S 13/02* (2006.01)
*G01S 13/87* (2006.01)
(Continued)

(52) U.S. Cl.
CPC .......... *G01S 13/0218* (2013.01); *G01S 7/032* (2013.01); *G01S 13/874* (2013.01); *G01S 13/882* (2013.01);
(Continued)

(58) Field of Classification Search
CPC combination set(s) only.
See application file for complete search history.

(56) References Cited

U.S. PATENT DOCUMENTS 4,894,662 A *  1/1990  Counselman .......... G01C 15/00
                                                    342/357.25
8,259,003 B2 * 9/2012  Song .................... G01S 13/282
                                                    342/132
(Continued)

FOREIGN PATENT DOCUMENTS

| CN | 103698760 A | 4/2014 |
| CN | 103760552 A | 4/2014 |
| CN | 203673066 U | 6/2014 |

OTHER PUBLICATIONS

International Search Report and Written Opinion on PCT/CN2016/000307 (parent of the present application).

*Primary Examiner* — Mamadou L Diallo
(74) *Attorney, Agent, or Firm* — Yong Chen (57) ABSTRACT

A buoy-type high-frequency ground wave radar system. A buoy platform is used as an offshore carrier of a ground wave radar. A sky wave emission subsystem is disposed on a shore base and emits a high-frequency electromagnet wave. After the high-frequency electromagnet wave is refracted by the ionosphere and is reflected by the sea surface, a sky wave signal is formed. An attitude measurement subsystem measures and acquires attitude data of the buoy platform in real time. A ground wave radar subsystem receives a ground wave signal by using the ground wave radar, and processes the signal to form a ground wave (Continued)

doppler spectrum. Simultaneously, the sky wave signal is received, ionosphere disturbance compensation is performed on the sky wave signal in a frequency domain and then the sky wave signal is processed to form a sky wave doppler spectrum. The ground wave radar subsystem reconstructs an actual geographic coordinate system according to the attitude data measured by the attitude measurement subsystem and then the ground wave or the sky wave doppler spectrum is used to inverse wind wave current data in the reconstructed actual geographic coordinate system. The sky wave emission subsystem and the ground wave radar subsystem carry out time synchronization by means of a GPS synchronization networking. The system can detect a sea region of any distance and is suitable for high sea detection.

8 Claims, 3 Drawing Sheets

(51) Int. Cl.
    *G01S 13/95*     (2006.01)
    *G01S 7/03*     (2006.01)
    *G01S 13/88*     (2006.01)
    *G01S 7/41*     (2006.01)

(52) U.S. Cl.
    CPC ............... *G01S 13/95* (2013.01); *G01S 7/411* (2013.01); *G01S 2013/0227* (2013.01); *Y02A 90/18* (2018.01)

(56) References Cited

U.S. PATENT DOCUMENTS

| | | | |
|---|---|---|---|
| 9,423,495 B1* | 8/2016 | Chang | H01Q 7/00 |
| 2011/0273958 A1* | 11/2011 | Xia | G01V 1/3817 367/21 |
| 2013/0050024 A1* | 2/2013 | Barott | G01S 13/003 342/454 |
| 2016/0011318 A1* | 1/2016 | Cohen | G01S 19/43 342/357.26 |
| 2016/0327668 A1* | 11/2016 | Pires De Vasconcelos | G01S 15/8977 |
| 2018/0267157 A1* | 9/2018 | Guruprasad | G01S 17/006 |
| 2019/0182415 A1* | 6/2019 | Sivan | G06F 3/012 |

\* cited by examiner

BUOY-TYPE HIGH FREQUENCY GROUND-WAVE RADAR SYSTEM

CROSS-REFERENCE TO RELATED APPLICATIONS

This application is a continuation of International Patent Application No. PCT/CN2016/000307, filed Jun. 16, 2016, which claims priority to Chinese Patent Application No. 201510568167.2, filed Sep. 9, 2015. The disclosures of these prior-filed applications are incorporated by reference herein in their entirety.

FIELD OF TECHNOLOGY

The disclosure relates to the field of ocean environment monitoring.

BACKGROUND

The economic relationship between human and ocean is developing further and further in the order of "point-line-plane-body", and such development is becoming faster and faster. The ocean is becoming more and more important and has an increasingly large effect on human, ranging from human survival level to economy level, and even rising to the level of politics and international relationship. However, the ocean monitoring capability of human always lags behind their oceanic practical activities, and now basically stays on the level of "point" and "line", which cannot meet the requirement of monitoring the "plane" and "body" of the ocean in real-time.

The poor ocean monitoring capability is a major problem having affected the development of our country's oceanic economy, the prevention of oceanic disasters, and national safety and unity for a long time. As a non-contact shore base remote sensing device with the advantages of large-area, all-weather and low-cost, high frequency ground-wave radar is the best tool for realizing the real-time ocean monitoring on the "plane" level. However, if the effective supervision of the main coastal sea area throughout the country is to be realized, it will be necessary to arrange tens of or even hundreds of ground-wave radars of different type at a coastal area so as to form a radar network and perform detection. This has not only solved the capability insufficiency of our country's traditional ocean monitoring instrument, greatly improved the capability of conducting real-time monitoring for the ocean environment around our country, and realized a new "generation" of our country's ocean monitoring capability; meanwhile a large amount of expenditure for infrastructure construction can be saved.

The detection range of existing shore base medium and long range ground-wave radar device is usually 200 km and the detection range of short range ground-wave radar device is smaller; maritime international law specifies 200 nautical miles as exclusive economic zone, so obviously it is difficult to meet the requirement of exclusive economic zone monitoring by utilizing the ground-wave radar device of shore base, and the national strategy of collecting pelagic information and data is made clear in our country's Deep and Open Sea Development Plan. Therefore, it is necessary to realize the monitoring for high sea, and conducting real-time monitoring for high sea beyond 200 km by researching and developing a buoy-type high frequency ground-wave radar system etc. is the best supplement to the existing shore base ground-wave radar. Building an unmanned ground-wave radar system platform with fully-automatic working capability is particularly important for monitoring the ocean environment, which is a passage of strategic importance.

Presently, the insufficiency of high frequency ground-wave radar is obvious in terms of detection range, detecting element precision and applicability etc., mainly including the following five aspects:

A. The effective coverage of radar is insufficient. Coastal economic activities as well as disaster prevention and reduction require a good knowledge of the state of the ocean within hundreds of kilometers or even thousands of kilometers, but the relatively effective detection range of currently-deployed ground-wave radar is usually within 150 km. The increase in detection range is usually realized by reducing working frequency and increasing emitting power. The reduction of working frequency means the increase of radar antenna dimension and device complexity as well as the reduction of result resolution and result precision, thus the capability of detecting medium and short dimension gravity wave information will be weakened. The increase of emitting power reduces the reliability of device and the applicability of electromagnetic environment, and importantly, the speed of the increase of detection range detection range will rapidly reduce as the emitting power increases; if the power is improved from 10 kW to 100 kW, the detection range will only increase by 30~40 km, and the operation cost of radar will increase exponentially as the detection range becomes long. Therefore, the detection range cannot be greatly improved just by the ground-wave radar itself. As an effective approach to increasing the detection range of ocean monitoring radar, buoy-type high frequency ground-wave radar can greatly improve the detection range of high frequency radar system by means of the long-distance transmitting mechanism of sky-wave, the networking of distributed radar, and the integration of sky-wave and ground-wave.

B. The amount of detected information is insufficient, so the accuracy and reliability of the detection result is not high. Up to now, all the domestic ground-wave radars for ocean detection belong to single station radar with a common station for receiving and sending, and the radar only extracts information from the backward scattered echo wave of sea surface, and the information contained in the backward scattered echo wave, especially the direction information on physical parameters (e.g., flow direction, wind direction and wave direction etc.) is extremely limited, leading to large direction error of detected parameters and the serious reduction of radar detection accuracy, thus the result is not usable. This problem is obvious in comparison tests and practical use of high frequency ground-wave radar in recent years, and is a fundamental technical bottleneck which restricts ground-wave radar from being used more widely. Thus, it is urgent to develop a radar system capable of obtaining the non-backward scattered information of sea surface, i.e., a distributed high frequency radar system in the mode of "multiple sending and multiple receiving" composed of a plurality of participating radars at different. It is not a simple combination of the inversion result from multiple single-station radars, but obtains relatively comprehensive information at the raw signal level. It can significantly improve the detection accuracy of wind, wave and current to ensure our country's ocean detection with high frequency ground-wave radar to enter the phase of operational application. Meanwhile, buoy-type high frequency ground-wave radar can also provide a large amount of detection information which is based on open-sea detection and makes up for the shortage of the high sea data amount of shore base radar.

C. The anti-interference ability of radar system is insufficient. The high frequency radar works in a frequency range with strong interference. In particular, ionosphere interference, radio frequency interference and transient impact interference are serious, among which the ionosphere interference is the most serious problem faced by the ground-wave radar of middle and low latitude area, and is one of the major difficulties restricting the application of ground-wave radar. Presently, there is no effective way to restrain ionosphere interference in the world. The ionosphere has high interference intensity and very complex signal characteristics. A great deal of research domestically and abroad indicate that ionosphere interference cannot be controlled easily in single station radars, and a distributed high frequency radar system with "multiple sending and multiple receiving" as well as the detection information of ionosphere vertical measurement instrument and oblique measurement instrument have almost become the only choice for improving the ionosphere interference resistant capability of an over-the-horizon radar. One advantage of long-distance detection via sky-wave transmitting and ground-wave receiving is that the interference of the F region of the ionosphere will be avoided, and the usual interference of the F region of the ionosphere in the echo wave spectrum of ground-wave radar will not exist in the received echo wave spectrum. Certainly, the electron density change or movement of ionosphere reflection points during sky-wave transmission will cause the shifting and widening of the spectrum, but such influence can be compensated via the sea surface information obtained by ground-wave.

D. Conventional high-frequency ground-wave radar system conducts detection in a single mode, therefore a precise and detailed detection result cannot be obtained. At present, most high-frequency ground-wave radars for ocean detection are arranged near coastline, thus the choice of location is usually limited by location-specific factors, and only the backward scattered echo wave of its own can be received, the detection is done in a single mode, and therefore the precision of result is not high. The distributed high frequency radar system can provide a variety of detection modes, which helps to realize the detailed observation of near-shore.

E. At present, the high-frequency radio band is very crowded, and frequency resource is very precious. Medium and long range radars usually work in the frequency range of 5~15 MHz, which range has been crowded with a large number of civil communication channels. When conventional single-station radar is used for detection, every radar station of the same sea area needs to work on different working frequency to avoid mutual interference. Therefore, the current frequency resource of high frequency range can no longer support the addition of more single-station radar for ocean monitoring, which has become one of the most important social factors restricting the wide use of ground-wave radar. By contrast, distributed high frequency radar networking can solve this problem, and all the radars of the same sea area use the same frequency, which greatly saves the occupied frequency band of the radar network, reduces the possibility of being interfered, and facilitates the popularization of over-the-horizon radar in ocean environment monitoring.

The buoy-type high frequency ground-wave radar can overcome the foregoing drawbacks, break the limit that conventional ground-wave radars can only be arranged along coastline, extend the detection range to high sea area by receiving sky-ground mixed path echo wave, and greatly enhance the flexibility of radar system deployment. Meanwhile, this system has expandability and the potential for accommodating further radar nodes, making diversified application possible.

SUMMARY

In the view of above, the disclosure provides a buoy-type high frequency ground-wave radar system with two detection working modes (ground-wave and sky-wave), capable of detecting a sea area of any distance and applicable to high sea detection.

To achieve the aforementioned objective, the technical solution of this invention is a system comprising a buoy platform, a sky-wave emitting subsystem, a ground-wave radar subsystem and an attitude measurement subsystem; the system is used for the extraction of marine wind, wave, and current from inversion of ground-wave radar.

The buoy platform can be the maritime carrier of the ground-wave radar.

The sky-wave emitting subsystem is disposed at shore base to emit high frequency electromagnetic wave, and the high frequency electromagnetic wave is refracted to sea surface via the ionosphere, reflected via the sea surface, and received by the ground-wave radar subsystem as sky-wave signals.

The attitude measurement subsystem conducts real-time measurement to obtain the attitude data of buoy platform.

The ground-wave radar subsystem uses ground-wave radar to receive ground-wave signal on one hand and receive sky-wave signal on the other hand; the ground-wave signal is directly processed to form ground-wave Doppler spectrum; the sky-wave signal is processed to form sky-wave Doppler spectrum after receiving the ionosphere disturbance compensation in the frequency domain; the ground-wave radar subsystem reconstructs actual geographic coordinate system on the basis of the attitude data measured by the attitude measurement subsystem, and obtains wind, wave, and current data by conducting inversion for ground-wave Doppler spectrum or sky-wave Doppler spectrum in the reconstructed actual geographic coordinate system.

The sky-wave emitting subsystem and the ground-wave radar subsystem conduct time synchronization via GPS synchronous networking.

Furthermore, the buoy platform consists of a main floating body and an instrument cabin, and the main floating body comprises three connecting floating body frames, twelve sets of connecting bridges and six buoyancy cabin bodies. The three floating body frames are arranged in parallel, and six sets of connecting bridges are respectively used between two adjacent floating body frames for mutual connection, and the two ends of the bottom of each floating body frame are fixed with two buoyancy cabin bodies. The floating body frames and the connecting bridges are made of stainless steel; the buoyancy cabin body is a cabin structure using steel frame as the supporting framework, and the surface is glass fiber reinforced plastics, and the inside is filled with a buoyancy material; the instrument cabin is disposed on the main floating body.

Furthermore, the sky-wave emitting subsystem consists of an antenna module, an all-solid-state emitting module, an excitation source module, a first GPS synchronous networking module, an ionosphere analysis module and a sky-wave emitting control module; the antenna module is log-periodic antenna array, and every antenna in the antenna array emits high frequency linear frequency modulation continuous wave signal, i.e., high frequency electromagnetic wave; the all-solid-state emitting module comprises a plurality of power amplifying modules, and the number of power amplifying modules is consistent with that of the antennas in antenna array, and each power amplifying assembly outputs high frequency linear frequency modulation continuous wave signal to a corresponding antenna; the excitation source module comprises a plurality of excitation sources, and the number of excitation sources is consistent with that of power amplifying modules, and each excitation source outputs high frequency linear frequency modulation continuous wave signal to a corresponding power amplifying module as excitation; the excitation source module receives the excitation control signal of the sky-wave emitting control module and outputs the excitation; the first GPS synchronous networking module comprises a GPS signal receiver and a frequency source calibrating circuit; the GPS signal receiver receives the signal of GPS satellite, obtains pulse-per-second signal via modulation, and inputs it to the frequency source calibrating circuit, and the calibrating signal of the frequency source calibrating circuit is inputted to the excitation source module to calibrate the frequency for each excitation source; the ionosphere analysis module comprises an ionosphere vertical measurement instrument and an analysis submodule, and the ionosphere vertical measurement instrument is disposed at the middle point of the transmission path between the sky-wave emitting subsystem and the ionosphere, and the analysis submodule obtains the vertical measurement data in the ionosphere vertical measurement instrument, establishes an ionosphere model, and analyzes and calculates ionosphere disturbance information; the ionosphere disturbance information is transmitted to the Internet via the sky-wave emitting control module; the ground-wave radar transmits the frequency spectrum signal of the received sky-wave signal to the Internet, and the sky-wave emitting control module obtains the frequency spectrum signal of the sky-wave signal received by the ground-wave radar from the Internet, matches the frequency spectrum signal of the sky-wave signal received by ground-wave radar with the frequency spectrum signal of the signal emitted by antenna module, and adjusts excitation control signal on the basis of matching information to control the output of the excitation source, and thereby the frequency spectrum signal of the sky-wave signal received by ground-wave radar matches the frequency spectrum signal of the signal emitted by antenna module.

Furthermore, the antenna module consists of five horizontally-polarized log-periodic antenna unit arrangement, i.e., 1×5 linear array, and the height of one log-periodic antenna is 12 m, and the interval of each log-periodic antenna is 20 m, and each log-periodic antenna emits 2 kW linear frequency modulation continuous wave signal.

Furthermore, the excitation source comprises five excitation sources corresponding to five power amplifying modules respectively; the excitation source consists of a direct digital synthesizer DDS and an emitting assembly based on DDS, and the excitation control signal conducts control so that the signal waveform coming from the DDS in each excitation source and meeting requirement is used as excitation and outputted via the emitting assembly based on DDS.

Furthermore, the ground-wave radar subsystem includes the structure of the ground-wave radar, and further includes a second GPS synchronous networking module and a sky-wave receiving module; the second GPS synchronous networking module matches with the first GPS synchronous networking module, and the second GPS synchronous networking module transmits the synchronization signal to the sky-wave receiving module after the synchronization of the two modules; the ground-wave radar subsystem obtains the ionosphere disturbance information from the Internet; the sky-wave receiving module determines whether the received signal is sky-wave signal or not on the basis of synchronization signal; if the received signal is sky-wave signal, analog-to-digital AD conversion and Fourier Transform FFT is conducted for the sky-wave signal to obtain frequency domain signal of the sky-wave signal, then ionosphere disturbance compensation is conducted for the frequency domain signal of sky-wave signal on the basis of the ionosphere disturbance information; on one hand, the frequency spectrum signal of the sky-wave signal after compensation is sent to the Internet; on the other hand, secondary FFT is conducted to form sky-wave Doppler spectrum; if the received signal is ground-wave signal, the ground-wave radar directly processes and obtain ground-wave Doppler spectrum.

Furthermore, the attitude measurement control subsystem comprises an attitude sensing module and a dual GPS antenna; the attitude sensing module is disposed at the gravity center of the buoy platform, and the line connecting two points of the dual GPS antenna is perpendicular to the direction of the antenna connector of the attitude sensing module, and the line connecting two points of the dual GPS antenna is parallel to one side of the buoy platform; the GPS information of the dual GPS antenna is transmitted to the attitude sensing module, and the attitude sensing module obtains the angle, angular velocity and angular acceleration of the buoy platform under the coordinate axes x, y and z as well as the true north information of buoy platform; the two sides of the buoy platform are set as xy plane, and the direction perpendicular to the buoy platform is set as z axis.

Moreover, the system further comprises an intelligent power supply control subsystem used to provide power for the ground-wave radar subsystem; the intelligent power supply control subsystem comprises a main control circuit, a communication circuit, a sampling circuit, a driving circuit and an interface circuit, an upper computer control unit, power source module, and a water inflow alarm unit disposed on the buoy-type high frequency ground-wave radar. The power source module supplies power to each device of the buoy-type high frequency ground-wave radar via different voltage ports respectively; the sampling circuit collects the temperature of power source module and the power supply voltage of each device on buoy-type high frequency ground-wave radar, and sends them to the main control circuit as sampling signal; the main control circuit receives the sampling signal sent by the sampling circuit, the water inflow alarm signal sent by the water inflow alarm unit, the control command sent by the upper computer control unit via the communication circuit; meanwhile the main control circuit sends power-on/off control signal to the power source module via the driving circuit and the interface circuit successively so as to control the on/off of each voltage port of the power source module respectively; the main control circuit determines whether water flows into the cabin provided with the water inflow alarm unit in accordance with the water inflow state signal sent by the water inflow alarm unit; if water flows into the cabin, the main control circuit sends a power-off control signal to the power source module via the driving circuit so that the power source module conducts time-delayed power-off and all the voltage ports of power source module are thereby switched off; otherwise the power source module normally supplies power to each device; the main control circuit is provided with a temperature limit value of the power source module, and the main control circuit determines whether the operation of the power source module is normal or not in accordance with the power source module temperature sent by the sampling circuit; if the temperature of power source module exceeds the set temperature limit value, the main control circuit determines that the operation of power source module is abnormal and send a power-off control signal to power source module via the driving circuit so that the power source module conducts time-delayed power-off and all the voltage ports of the power source module will be switched off; otherwise the power source module normally supplies power to each device; the main control circuit is provided with the working voltage range of each device on the buoy-type high frequency ground-wave radar, and the main control circuit compares the power supply voltage of each device sent by the sampling circuit with the corresponding voltage range value of the device; if the working voltage of the device is within the set working voltage range, the power source module normally supplies power to each device; if the working voltage of the device is not within the set working voltage range, the power-off of the corresponding device is conducted; the main control circuit can control the power-on/off of the device on the buoy-type high frequency ground-wave radar in accordance with the control command sent by the upper computer control unit; the control command comprises real-time control command and working period control command; when the main control circuit receives the real-time control command for a certain device, it conducts power-on/off operation for the device via the driving circuit immediately; if the main control circuit receives the working period control command for a certain device, it conducts power-on and power-off for the corresponding device at a corresponding time in the command.

The sampling circuit collects the power level of power source module in real time and sends it to the main control circuit as sampling signal; the main control circuit conducts power-on/off control for the selected device in accordance with the power level of the power source module; specifically, the main control circuit is pre-stored with the corresponding power supply port of the selected device, and if the power level of the power source module is greater than or equal to the set threshold value in the main control circuit, it indicates that the current power level is sufficient, and the device will be switched on via the driving circuit; if the power level of the power source is smaller than the set threshold value, the device is switched off via the driving circuit.

The upper computer control unit is provided with an interface for human-computer interaction, via which an operator can, by remote log-in, directly control the power-on/off of the selected device on the radar or set the working period of each device on the radar for the purpose of automatic power-on/off.

Furthermore, the power source module comprises a solar panel assembly, an energy storage battery assembly and an integrated power source; the inside of the integrated power source is provided with a solar energy controller, a power source conversion submodule and a power source conversion control submodule. The solar panel assembly and the energy storage battery assembly are respectively connected with the power source conversion submodule via the solar energy controller, and the power source conversion submodule conducts conversion for the voltage outputted by the solar panel assembly or the energy storage battery assembly under the control of the power source conversion control submodule, and supplies the converted voltage to the ground-wave radar subsystem via a power source output interface.

The solar energy controller compares the electrical energy converted by the solar panel assembly with the set power supply requirement of the ground-wave radar subsystem to determine the power supply mode of the power source system, and specifically, when the electrical energy converted by solar panel group can satisfy the power supply requirement of the load, while satisfying the power supply requirement of the ground-wave radar subsystem, the remaining electrical energy charges the energy storage battery assembly via the solar energy controller; when the electrical energy converted by solar panel assembly cannot satisfy the power supply requirement of ground-wave radar subsystem, the solar energy controller controls the energy storage battery assembly to discharge electrical energy to supply power to the ground-wave radar subsystem.

When the energy storage battery assembly is charged, the solar energy controller controls the output current of the solar panel assembly charging the energy storage battery assembly in accordance with the collected voltage state of the energy storage battery assembly so as to control the charging speed of the energy storage battery assembly; when the energy storage battery assembly is used to supply power to the load, the output current of energy storage battery assembly is controlled via the power source conversion control submodule.

The solar panel assembly comprises 4N solar panels and N is an integer larger than 1; every N solar panels constitute a solar panel unit; at the time of connection, firstly the N solar panels in the solar panel unit are connected in parallel, then four solar panel units are connected in parallel; the 4N solar panels are uniformly distributed in the directions East, South, West and North, and every solar panel unit comprises the solar panels with same quantity and different orientation.

The energy storage battery assembly comprises one or more battery unit, and every battery unit comprises 2M energy storage batteries and M is an integer larger than 1; two energy storage batteries inside each battery unit are firstly connected in parallel and then connected in series, and battery units are connected in parallel.

Useful Effects of the Invention

1. The present system has two working modes (ground-wave and sky-wave) to conduct detection, and is capable of detecting a sea area of any distance. It is suitable for open-sea monitoring.

2. The present system includes full considerations of the sea conditions in arranging high frequency ground-wave radar at sea, reliability assurance designs for the buoy platform, and comprehensive considerations for floating body dimension and transportation convenience, and uses three floating body frames as a main frame connection; and a buoyancy cabin body disposed under the floating body frame. The buoy platform can follow the waves and has good stability, and can withstand a sea condition of level 5 or above.

3. This invention fully considers the change of reference plane caused by wind and waves when the ground-wave radar is arranged at sea surface, so an attitude measurement control subsystem is included to measure and obtain the real-time position and attitude of buoy platform, and an actual geographic coordinate system is rebuilt to realize a more precise and objective wind-wave-current data inversion.

4. This invention fully considers that the time of the shore base and the time of buoy platform are out of synchronization, and provide synchronization of the time of the shore base and the time of the buoy platform via GPS synchronous networking, and thereby the time of the two places are synchronized, making it possible to conduct receiving and processing for sky-wave and ground-wave data asynchronously.

5. This system can realize the automatic power supply and automatic power supply control of solar energy, and thus can fully realize unmanned guarding and can monitor shore base staff.

DESCRIPTION OF THE EMBODIMENTS

The present invention will be described in detail by referring to the following attached drawings.

Example 1

Figure 1:
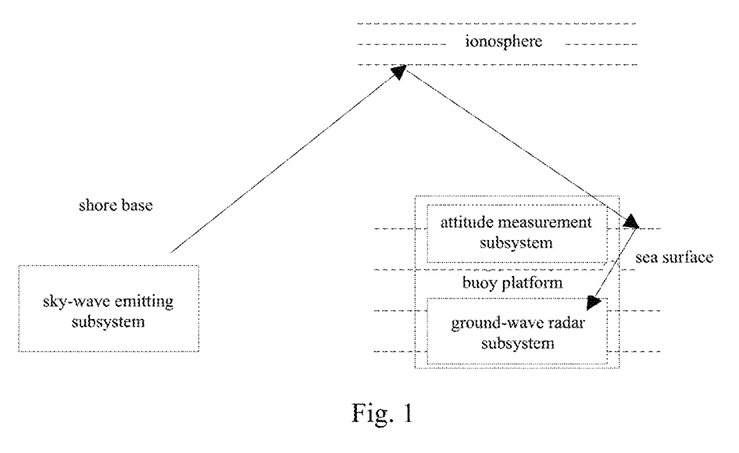
FIG. 1 is a diagram for the system components of the present invention.

The present invention provides a buoy-type high frequency ground-wave radar system, and as shown in FIG. 1, this system comprises a buoy platform, a sky-wave emitting subsystem, a ground-wave radar subsystem and an attitude measurement subsystem; the system is used for obtaining the maritime wind, wave, and current information from the inversion of ground-wave radar.

The buoy platform is the maritime carrier of ground-wave radar, and its structure need not be limited so long as it is a ground-wave radar carrier capable of being arranged at sea.

The sky-wave emitting subsystem is disposed at shore base to emit high frequency electromagnetic wave, and the high frequency electromagnetic wave is refracted to sea surface via the ionosphere, reflected via sea surface, and received by the ground-wave radar subsystem as sky-wave signal.

The attitude measurement subsystem conducts real-time measurement to obtain the attitude data of buoy platform.

The ground-wave radar subsystem uses ground-wave radar to receive ground-wave signal on one hand and receive sky-wave signal on the other hand; the ground-wave signal is directly processed to form ground-wave Doppler spectrum; the sky-wave signal is processed to form sky-wave Doppler spectrum after receiving the ionosphere disturbance compensation in the frequency domain; the ground-wave radar subsystem reconstructs an actual geographic coordinate system on the basis of the attitude data measured by the attitude measurement subsystem, and obtains wind, wave, and current data by conducting inversion for ground-wave Doppler spectrum or sky-wave Doppler spectrum in the rebuilt actual geographic coordinate system.

The sky-wave emitting subsystem and the ground-wave radar subsystem are time synchronized via GPS synchronous networking.

This system has two working modes (ground-wave and sky-wave) to conduct detection, and is capable of monitoring sea area of any distance. It is suitable for open-sea monitoring.

Example 2

Figure 2:
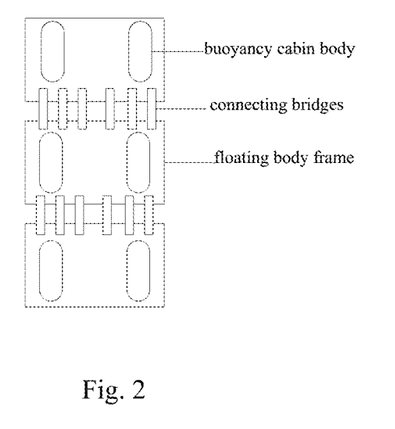
FIG. 2 is a schematic diagram of the structure of a buoy platform.

Based on the solution given in example 1, as for the function of buoy platform, to enable the buoy platform to have the characteristic of following waves as well as stability to a certain degree and withstand the sea condition of level 5 or above, this example provides the following embodiment:

As shown in FIG. 2, the buoy platform consists of a main floating body and an instrument cabin, and the main floating body comprises three connecting floating body frames, twelve sets of connecting bridges and six buoyancy cabin bodies.

The three floating body frames are arranged in parallel, and six sets of connecting bridges are respectively used between two adjacent floating body frames for mutual connection, and the two ends of the bottom of each floating body frame are fixed with two buoyancy cabin bodies.

The buoyancy frames and the connecting bridges are made of stainless steel.

The buoyancy cabin body is a cabin structure using steel frame as supporting framework, and the surface is glass fiber reinforced plastics, and its inside is filled with a buoyancy material; the instrument cabin is disposed on the main floating body.

This system takes consideration of the sea conditions when the high frequency ground-wave radar is arranged at sea, and include design elements to improve the reliability of for the buoy platform; it also take comprehensive considerations in the floating body dimension and transportation convenience, and uses three floating body frames as the main frame connection; meanwhile, a buoyancy cabin body is disposed under the floating body frame, and thereby the buoy platform has the characteristic of following the waves as well as being stable, and can withstand the sea condition of level 5 or above.

Example 3

Figure 3:
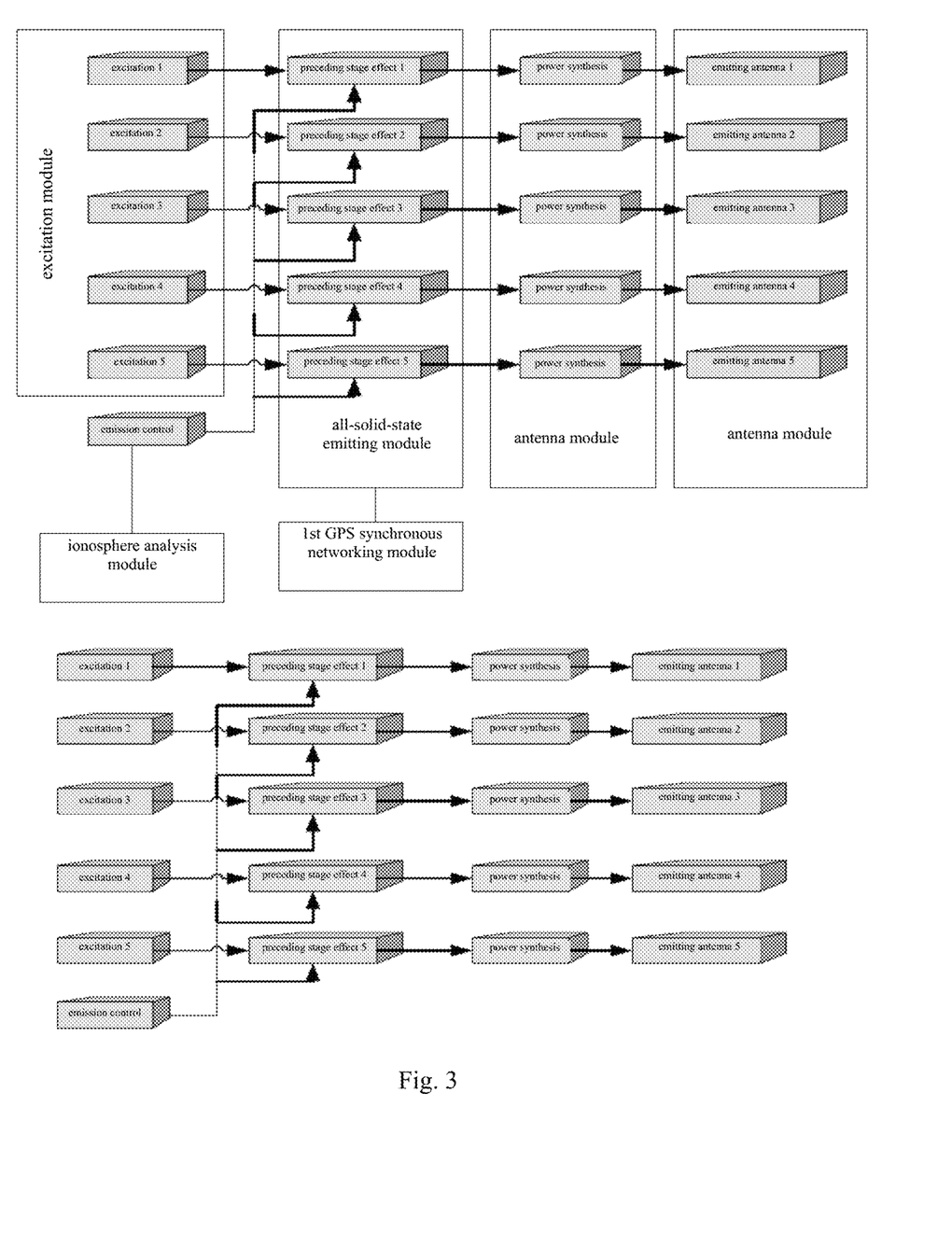
FIG. 3 is a schematic diagram of the structural organization of a sky-wave emitting subsystem.

Based on the sky-wave emitting subsystem given in Example 1, this example gives a concrete embodiment as shown in FIG. 3, and it is not limited to this form at the time of carrying out the embodiment.

The sky-wave emitting subsystem in this example consists of an antenna module, an all-solid-state emitting module, an excitation source module, a first GPS synchronous networking module, an ionosphere analysis module and a sky-wave emitting control module.

The antenna module is a log-periodic antenna array, and every antenna in the antenna array emits high frequency linear frequency modulation continuous wave signal, i.e., high frequency electromagnetic wave. To further describe the arrangement of antenna array, an example will be given as follows: the antenna module consists of five horizontally-polarized log-periodic antenna unit arrangement, i.e., 1×5 linear array, and the height of one log-periodic antenna is 12 m, and the interval of each log-periodic antenna is 20 m, and each log-periodic antenna emits 2 kW linear frequency modulation continuous wave signal.

The all-solid-state emitting module comprises a plurality of power amplifying modules, and the number of power amplifying modules is consistent with that of the antennas in antenna array, and each power amplifying module outputs high frequency linear frequency modulation continuous wave signal to a corresponding antenna.

The excitation source module comprises a plurality of excitation sources, and the number of excitation sources is the same as that of power amplifying modules, and each excitation source outputs high frequency linear frequency modulation continuous wave signal to a corresponding power amplifying module as excitation; the excitation source module receives the excitation control signal of the sky-wave emitting control module and outputs the excitation. Regarding the foregoing example, the excitation source comprises five excitation sources corresponding to five power amplifying modules respectively; the excitation source consists of a direct digital synthesizer DDS and an emitting assembly based on the DDS, and the excitation control signal controls the signal waveform coming from the DDS in each excitation source that meets prerequisite requirement, which is used as excitation and outputted via the DDS-based emitting assembly.

The first GPS synchronous networking module comprises a GPS signal receiver and a frequency source calibrating circuit; the GPS signal receiver receives the signal of GPS satellite, obtains pulse-per-second signal via modulation, and inputs it to the frequency source calibrating circuit, and the calibrating signal of the frequency source calibrating circuit is inputted to the excitation source module to calibrate the frequency for each excitation source.

The ionosphere analysis module comprises an ionosphere vertical measurement instrument and an analysis submodule, and the ionosphere vertical measurement instrument is disposed at the middle point of the transmission path between the sky-wave emitting subsystem and the ionosphere, and the analysis submodule obtains the vertical measurement data in the ionosphere vertical measurement instrument (e.g., the electron density of each layer surface and the distribution of electromagnetic field of the ionosphere), establishes ionosphere model, and analyzes and calculates ionosphere disturbance information; the ionosphere disturbance information is transmitted to the Internet via the sky-wave emitting control module.

The ground-wave radar transmits the frequency spectrum signal of the received sky-wave signal to the Internet, and the sky-wave emitting control module obtains the frequency spectrum signal of the sky-wave signal received by the ground-wave radar from the Internet, matches the frequency spectrum signal of the sky-wave signal received by ground-wave radar with the frequency spectrum signal of the signal emitted by antenna module, and adjusts excitation control signal on the basis of the matching information to control the output of excitation source, and thereby the frequency spectrum signal of the sky-wave signal received by ground-wave radar match the frequency spectrum signal of the signal emitted by antenna module.

Example 4

In addition to the structure of the ground-wave radar, the ground-wave radar subsystem further includes a second GPS synchronous networking module and a sky-wave receiving module;

The second GPS synchronous networking module matches with the first GPS synchronous networking module, and the second GPS synchronous networking module transmits synchronization signal to the sky-wave receiving module after the synchronization of the two modules.

The ground-wave radar subsystem obtains the ionosphere disturbance information from the Internet.

The sky-wave receiving module determines whether the received signal is sky-wave signal or not on the basis of synchronization signal; if the received signal is sky-wave signal, analog-to-digital AD conversion and Fourier Transform FFT is conducted for the sky-wave signal to obtain the frequency domain signal of sky-wave signal, then ionosphere disturbance compensation is conducted for the frequency domain signal of the sky-wave signal on the basis of the ionosphere disturbance information; on one hand, the frequency spectrum signal of the sky-wave signal after compensation is sent to the Internet; on the other hand, secondary FFT is conducted to form a sky-wave Doppler spectrum. The reason why the ionosphere disturbance compensation is to be conducted is that the ionosphere is space-time varying dispersive channel, and the height, density and thickness of the ionosphere takes on temporal and seasonal change under the influence of the sun; the multi-mode and multi-path effect of the ionosphere, the random disturbance of space-time, the traveling disturbance of the ionosphere, and the inclination of the ionosphere have a very important influence on the coordinate registration of sky-wave over-the-horizon radar, object precise positioning, and trajectory tracking.

If it is ground-wave signal, the ground-wave radar directly processes the signal and obtain ground-wave Doppler spectrum.

The reason of using GPS module: the sky-ground networking detection adopts multi-base mode, and receiving is separated from sending; if precise signal group time delay information and Doppler information are to be obtained during the online observation of system, strict time-synchronization and frequency-synchronization must be ensured between the emitting end and the receiving end. Therefore, the time and frequency synchronization between different stations can be realized only by a time and frequency synchronization device. In view of this, the time-and-frequency synchronization device of multi-base sky-ground networking detection system adopts a new time-and-frequency synchronization module based on GPS. This differs from a general GPS receiving system in that this system can not only provide standard time information, geographical position longitude and latitude information, etc. precisely, but also can realize the time and frequency synchronization of different places, and these functions are realized by an embedded control processing unit as well as an external high-performance hardware circuit, thus the measurement precision of the system is improved and the function of the system is broadened.

Example 5

Based on the aforementioned examples, this example describes the attitude measurement control subsystem in detail: the attitude measurement control subsystem comprises an attitude sensing module and a dual GPS antenna; the attitude sensing module is disposed at the gravity center of the buoy platform, and the line connecting two points of the dual GPS antenna is perpendicular to the direction of the antenna connector of attitude sensing module, and the line connecting two points of the dual GPS antenna is parallel to one side of the buoy platform; the GPS information of the dual GPS antenna is transmitted to the attitude sensing module, and the attitude sensing module obtains the angle, angular velocity and angular acceleration of the buoy platform under the coordinate axes x, y and z as well as the true north information of buoy platform; the two sides of the buoy platform are set as the xy plane, and the direction perpendicular to the buoy platform is set as the z axis.

Example 6

On the basis of example 1 and in view of the power supply problem of working on the high sea, this example provides an intelligent power supply control subsystem to supply power to the ground-wave radar subsystem; the intelligent power supply control subsystem comprises a main control circuit, a communication circuit, a sampling circuit, a driving circuit and an interface circuit, an upper computer control unit, a power source module, and a water inflow alarm unit disposed on the buoy-type high frequency ground-wave radar.

The power source module supplies power to each device of the buoy-type high frequency ground-wave radar via different voltage ports respectively.

The sampling circuit collects the temperature of the power source module and the power supply voltage of each device on the buoy-type high frequency ground-wave radar, and sends them to the main control circuit as sampling signal.

The main control circuit receives the sampling signal sent by the sampling circuit, the water inflow alarm signal sent by the water inflow alarm unit, the control command sent by the upper computer control unit via the communication circuit; meanwhile the main control circuit sends power-on/off control signal to the power source module via the driving circuit and the interface circuit successively so as to control the on/off of each voltage port of the power source module respectively.

The main control circuit determines whether water flows into the cabin provided with the water inflow alarm unit in accordance with the water inflow state signal sent by the water inflow alarm unit; if water flows into the cabin, the main control circuit sends a power-off control signal to the power source module via the driving circuit so that the power source module conducts time-delayed power-off and all the voltage ports of power source module are thereby switched off; otherwise the power source module normally supplies power to each device.

The inside of main control circuit is provided with a temperature limit value of power source module, and the main control circuit determines whether the operation of the power source module is normal or not in accordance with the power source module temperature sent by the sampling circuit; if the temperature of power source module exceeds the set temperature limit value, the main control circuit determines that the operation of power source module is abnormal and send a power-off control signal to the power source module via driving circuit so that the power source module conducts time-delay power-off and all the voltage ports of power source module are thereby switched off; otherwise the power source module normally supplies power to each device.

The inside of main control circuit is provided with the working voltage range of each device on the buoy-type high frequency ground-wave radar, and the main control circuit compares the power supply voltage of each device sent by the sampling circuit with the corresponding voltage range value of the device; if the working voltage of the device is within the set working voltage range, the power source module normally supplies power to each device; if the working voltage of the device is not within the set working voltage range, the corresponding device is powered off.

The main control circuit can control the power-on/off of the device on the buoy-type high frequency ground-wave radar in accordance with the control command sent by the upper computer control unit; the control command comprises real-time control command and working period control command; when the main control circuit receives the real-time control command for a certain device, it conducts power-on/off operation for the device via the driving circuit immediately; if the main control circuit receives the working period control command for a certain device, it conducts power-on and power-off for the corresponding device at a corresponding time in the command.

The sampling circuit collects the power level of the power source module in real time and sends it to the main control circuit as sampling signal; the main control circuit conducts power-on/off control for the selected device in accordance with the power level of the power source module; specifically, the main control circuit is pre-stored with the corresponding power supply port of the selected device, and if the power level of the power source module is greater than or equal to the set threshold value in the main control circuit, it indicates that the current power level is sufficient, and the device is switched on via the driving circuit; if the electricity quantity of power source is smaller than the set threshold value, the device is switched off via the driving circuit;

The upper computer control unit is provided with an interface for human-computer interaction, and by remote log-in, operators can directly control the power-on/off of the selected device on the radar or set the working period of each device on the radar for the purpose of automatic power-on/off.

Figure 4:
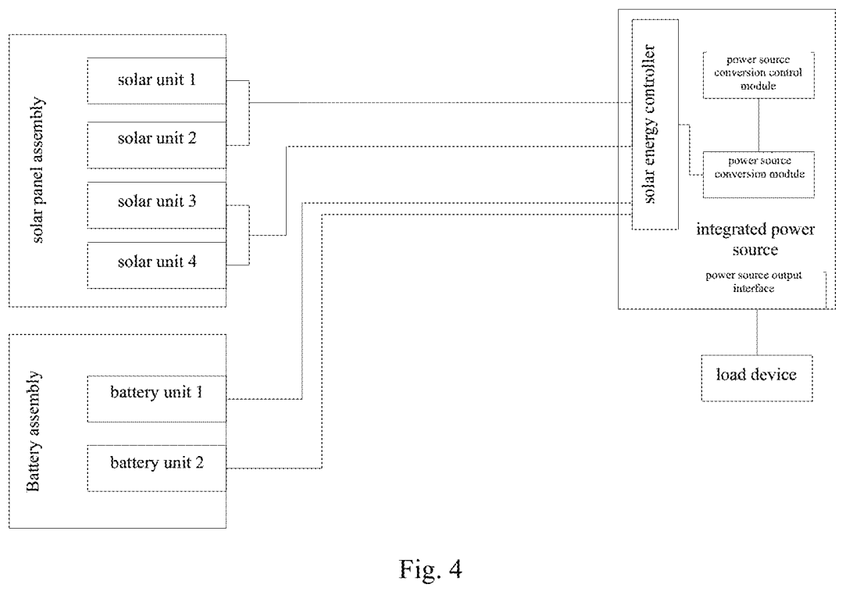
FIG. 4 is a schematic diagram of the structure of an intelligent power supply control subsystem.

To fit in with a maritime environment, this example proposes a power source module integrating solar energy and energy storage as shown in FIG. 4, and the power source module comprises a solar panel assembly, an energy storage battery assembly and an integrated power source; the inside of the integrated power source is provided with a solar energy controller, a power source conversion submodule and a power source conversion control submodule; the solar panel assembly and the energy storage battery assembly are respectively connected with the power source conversion submodule via the solar energy controller, and the power source conversion submodule conducts conversion for the voltage outputted by the solar panel assembly or the energy storage battery assembly under the control of the power source conversion control submodule, and supplies the converted voltage to the ground-wave radar subsystem via power source output interface.

The solar energy controller compares the electrical energy converted by the solar panel assembly with the set power supply requirement of the ground-wave radar subsystem to determine the power supply mode of the power source system, and specifically, when the electrical energy converted by solar panel assembly can satisfy the power supply requirement of the load, while satisfying the power supply requirement of the ground-wave radar subsystem, the remaining electrical energy charges the energy storage battery group via the solar energy controller; when the electrical energy converted by solar panel assembly cannot satisfy the power supply requirement of ground-wave radar subsystem, the solar energy controller controls the energy storage battery assembly to discharge the electrical energy to supply power to the ground-wave radar subsystem.

When the energy storage battery assembly is charged, the solar energy controller controls the output current of the solar panel assembly charging the energy storage battery assembly in accordance with the collected voltage state of the energy storage battery assembly so as to control the charging speed of the energy storage battery assembly; when the energy storage battery assembly is used to supply power to load, the output current of energy storage battery assembly is controlled via the power source conversion control submodule.

The solar panel assembly comprises 4N solar panels and N is an integer larger than 1; every N solar panels constitute a solar panel unit; at the time of connection, firstly the N solar panels in the solar panel unit are connected in parallel, then four solar panel units are connected in parallel; the 4N solar panels are uniformly distributed in the directions East, South, West and North, and every solar panel unit comprises the solar panels with same quantity and different orientation;

The energy storage battery assembly comprises one or more battery unit, and every battery unit comprises 2M energy storage batteries and M is an integer larger than 1; two energy storage batteries inside each battery unit are firstly connected in parallel and then connected in series, and battery units are connected in parallel.

In conclusion, the examples above are only preferred examples, and the protection scope of this invention is not limited to them. Any modifications, equivalent substitutions, improvements, and the like within the spirit and principles of the invention are intended to be included within the scope of the present invention.

What is claimed is:

1. A buoy-type high frequency ground-wave radar system, comprising:
    a buoy platform, a sky-wave emitting subsystem, a ground-wave radar subsystem and an attitude measurement subsystem; the system being useful for extracting the maritime wind, wave, and current from inversion of ground-wave radar;
    wherein the buoy platform is the maritime carrier of the ground-wave radar;
    wherein the sky-wave emitting subsystem is disposed at a shore base to emit high frequency electromagnetic wave, and the high frequency electromagnetic wave is refracted to the sea surface via the ionosphere, reflected via the sea surface, and received by the ground-wave radar subsystem as sky-wave signal;
    wherein the attitude measurement subsystem conducts real-time measurement to obtain the attitude data of the buoy platform;
    wherein the ground-wave radar subsystem uses ground-wave radar to receive ground-wave signal on one hand and receive sky-wave signal on the other hand; wherein the ground-wave signal is directly processed to form ground-wave Doppler spectrum; wherein the sky-wave signal is processed to form sky-wave Doppler spectrum after receiving an ionosphere disturbance compensation in the frequency domain; the ground-wave radar subsystem reconstructs an actual geographic coordinate system on the basis of the attitude data measured by the attitude measurement subsystem, and obtains wind wave current data by conducting inversion on ground-wave Doppler spectrum or sky-wave Doppler spectrum in the reconstructed actual geographic coordinate system; and
    wherein the sky-wave emitting subsystem and the ground-wave radar subsystem conduct time synchronization via GPS synchronous networking;
    wherein the buoy platform comprising a main floating body and an instrument cabin, and wherein the main floating body comprises three connecting floating body frames, twelve sets of connecting bridges and six buoyancy cabin bodies;
    wherein the three floating body frames are arranged in parallel, and a group of six of the twelve sets of connecting bridges are respectively used between two adjacent floating body frames for mutual connection, and the two ends of the bottom of each floating body frame are fixed with two buoyancy cabin bodies;
    wherein the floating body frames and the connecting bridges are made of stainless steel;
    wherein the buoyancy cabin body includes a steel frame as the supporting framework, a surface including glass fiber reinforced plastics, and an interior filled with a buoyancy material; and
    wherein the instrument cabin is disposed on the main floating body.

2. The buoy-type high frequency ground-wave radar system according to claim 1, wherein the sky-wave emitting subsystem comprises an antenna module, an all-solid-state emitting module, an excitation source module, a first GPS synchronous networking module, an ionosphere analysis module and a sky-wave emitting control module;
    wherein the antenna module is a log-periodic antenna array, and every antenna in the antenna array emits high frequency linear frequency modulation continuous wave signal;
    wherein the all-solid-state emitting module comprises a plurality of power amplifying modules, and the number of power amplifying modules is the same as that of the antennas in antenna array, and each power amplifying module outputs high frequency linear frequency modulation continuous wave signal to a corresponding antenna;
    wherein the excitation source module comprises a plurality of excitation sources, and the number of excitation sources is consistent with that of power amplifying modules, and each excitation source outputs high frequency linear frequency modulation continuous wave signal to a corresponding power amplifying module as excitation; the excitation source module receives an excitation control signal of the sky-wave emitting control module and conducts the output of excitation;
    wherein the first GPS synchronous networking module comprises a GPS signal receiver and a frequency source calibrating circuit; wherein the GPS signal receiver receives a signal of GPS satellite, obtains a pulse-per-second signal via modulation, and inputs it to the frequency source calibrating circuit, and the calibrating signal of the frequency source calibrating circuit is inputted to the excitation source module to calibrate the frequency for each excitation source;
    wherein the ionosphere analysis module comprises an ionosphere vertical measurement instrument and an analysis submodule, and the ionosphere vertical measurement instrument is disposed at the middle point of the transmission path between the sky-wave emitting subsystem and the ionosphere, and the analysis submodule obtains the vertical measurement data in the ionosphere vertical measurement instrument, establishes an ionosphere model, and analyzes and calculates ionosphere disturbance information; the ionosphere disturbance information is transmitted to the Internet via the sky-wave emitting control module;
    wherein the ground-wave radar transmits the a frequency spectrum signal of the received sky-wave signal to the Internet, and the sky-wave emitting control module obtains the frequency spectrum signal of the sky-wave signal received by the ground-wave radar from the Internet, matches the frequency spectrum signal of the sky-wave signal received by ground-wave radar with the frequency spectrum signal of the signal emitted by antenna module, and adjusts the excitation control signal on the basis of the matching information to control the output of excitation source, and thereby the frequency spectrum signal of the sky-wave signal received by ground-wave radar matches the frequency spectrum signal of the signal emitted by antenna module.

3. The buoy-type high frequency ground-wave radar system according to claim 2, wherein the antenna module comprises five horizontally-polarized log-periodic antenna units arranged in a linear array, and the height of one log-periodic antenna is 12 m, and the interval of each log-periodic antenna is 20 m, and each log-periodic antenna emits 2 kW linear frequency modulation continuous wave signal.

4. The buoy-type high frequency ground-wave radar system according to claim 3, wherein the excitation source comprises five excitation sources corresponding to five power amplifying modules respectively;

and wherein the excitation source comprises a direct digital synthesizer DDS and an emitting assembly based on the DDS, and the excitation control signal controls the signal waveform coming from the DDS in each excitation source which is used as excitation and outputted via the DDS-based emitting assembly.

5. The buoy-type high frequency ground-wave radar system according to claim 2, wherein the ground-wave radar subsystem further includes a second GPS synchronous networking module and a sky-wave receiving module in addition to the ground-wave radar;

wherein the second GPS synchronous networking module matches the first GPS synchronous networking module, and the second GPS synchronous networking module transmits synchronization signal to the sky-wave receiving module after the synchronization of the two modules;

wherein the ground-wave radar subsystem obtains the ionosphere disturbance information in the Internet;

wherein the sky-wave receiving module determines whether the received signal is sky-wave signal or not on the basis of synchronization signal; if the received signal is sky-wave signal, analog-to-digital AD conversion and Fourier Transform FFT is conducted for the sky-wave signal to obtain the frequency domain signal of the sky-wave signal, then ionosphere disturbance compensation is conducted for the frequency domain signal of sky-wave signal on the basis of the ionosphere disturbance information; on one hand, the frequency spectrum signal of the sky-wave signal after the compensation is sent to the Internet; on the other hand, secondary FFT is conducted to form sky-wave Doppler spectrum; and if the received signal is ground-wave signal, the ground-wave radar directly processes and obtain ground-wave Doppler spectrum.

6. The buoy-type high frequency ground-wave radar system according to claim 1, wherein the attitude measurement control subsystem comprises an attitude sensing module and a dual GPS antenna; the attitude sensing module is disposed at the gravity center of the buoy platform, and the line connecting two points of the dual GPS antenna is perpendicular to the direction of the antenna connector of attitude sensing module, and the line connecting two points of the dual GPS antenna is parallel to one side of the buoy platform; wherein the GPS information of the dual GPS antenna is transmitted to the attitude sensing module, and the attitude sensing module obtains the angle, angular velocity and angular acceleration of the buoy platform under the coordinate axes x, y and z as well as the true north information of buoy platform;

wherein two sides of the buoy platform are set as the xy plane, and the direction perpendicular to the xy plane is set as the z axis.

7. The buoy-type high frequency ground-wave radar system according to claim 1, further comprising an intelligent power supply control subsystem for intelligently supplying power to the ground-wave radar subsystem; wherein the intelligent power supply control subsystem comprises a main control circuit, a communication circuit, a sampling circuit, a driving circuit and an interface circuit, an upper computer control unit, a power source module, and a water inflow alarm unit disposed on the buoy-type high frequency ground-wave radar;

wherein the power source module supplies power to each device of the buoy-type high frequency ground-wave radar via different voltage port respectively;

wherein the sampling circuit collects the temperature of the power source module and the power supply voltage of each device on buoy-type high frequency ground-wave radar, and sends them to the main control circuit as sampling signal;

wherein the main control circuit receives sampling signal sent by the sampling circuit, water inflow alarm signal sent by the water inflow alarm unit, control command sent by the upper computer control unit via the communication circuit; meanwhile the main control circuit sends power-on/off control signal to the power source module via the driving circuit and the interface circuit successively to control the on/off of each voltage port of the power source module respectively;

wherein the main control circuit determines whether water flows into the cabin provided with the water inflow alarm unit in accordance with the water inflow state signal sent by the water inflow alarm unit; if water flows into the cabin, the main control circuit sends a power-off control signal to the power source module via the driving circuit so that the power source module will conduct time-delayed power-off and all the voltage ports of power source module are thereby switched off; otherwise the power source module normally supplies power to each device;

wherein the inside of main control circuit is provided with a temperature limit value of power source module, and the main control circuit determines whether the operation of power source module is normal or not in accordance with the power source module temperature sent by the sampling circuit; if the temperature of power source module exceeds the set temperature limit value, the main control circuit determines that the operation of the power source module is abnormal and sends a power-off control signal to power source module via the driving circuit so that the power source module conducts time-delayed power-off and all the voltage ports of power source module are thereby switched off; otherwise the power source module normally supplies power to each device;

wherein the inside of main control circuit is provided with a working voltage range of each device on the buoy-type high frequency ground-wave radar, and the main control circuit compares the power supply voltage of each device sent by the sampling circuit with the corresponding voltage range value of the device; if the working voltage of the device is within a set working voltage range, the power source module normally supplies power to each device; if the working voltage of the device is not within the set working voltage range, the corresponding device is powered off;

wherein the main control circuit controls the power-on/off of the device on the buoy-type high frequency ground-wave radar in accordance with the control command sent by the upper computer control unit; the control command comprises real-time control command and working period control command; when the main control circuit receives the real-time control command for a certain device, it conducts power-on/off operation for the device via the driving circuit immediately; if the main control circuit receives the working period control command for a certain device, it conducts power-on and power-off for the corresponding device at a corresponding time in the command;

wherein the sampling circuit collects the power level of the power source module in real time and sends it to the main control circuit as sampling signal; the main control circuit conducts power-on/off control for the selected device in accordance with the power level of the power source module; and wherein the upper computer control unit is provided with an interface for human-computer interaction, via which an operator can, by remote log-in, directly control the power-on/off of the selected device on radar or set the working period of each device on the radar for the purpose of automatic power-on/off.

8. The buoy-type high frequency ground-wave radar system according to claim 7, wherein the power source module comprises a solar panel assembly, an energy storage battery assembly and an integrated power source; the inside of the integrated power source is provided with a solar energy controller, a power source conversion submodule and a power source conversion control submodule; the solar panel assembly and the energy storage battery assembly are respectively connected with the power source conversion submodule via the solar energy controller, and the power source conversion submodule conducts conversion for the voltage outputted by the solar panel assembly or the energy storage battery assembly under the control of the power source conversion control submodule, and supplies the converted voltage to the ground-wave radar subsystem via power source output interface;

wherein the solar energy controller compares the electrical energy converted by the solar panel assembly with a set power supply requirement of the ground-wave radar subsystem to determine the power supply mode of the power source system, and specifically, when the electrical energy converted by solar panel assembly can satisfy the power requirement of the load, while satisfying the power supply requirement of the ground-wave radar subsystem, the remaining electrical energy charges the energy storage battery assembly via the solar energy controller; when the electrical energy converted by solar panel assembly cannot satisfy the power supply requirement of ground-wave radar subsystem, the solar energy controller will control the energy storage battery assembly to discharge the electrical energy to supply power to the ground-wave radar subsystem;

wherein when the energy storage battery assembly is charged, the solar energy controller controls the output current of the solar panel assembly charging the energy storage battery assembly in accordance with the collected voltage state of the energy storage battery assembly so as to control the charging speed of the energy storage battery assembly; when the energy storage battery assembly is used to supply power to load, the output current of energy storage battery assembly is controlled via the power source conversion control submodule;

wherein the solar panel assembly comprises 4N solar panels and N is an integer larger than 1; every N solar panels constitute a solar panel unit; at the time of connection, firstly the N solar panels in the solar panel unit are connected in parallel, then four solar panel units are connected in parallel; the 4N solar panels are uniformly distributed in the East, South, West and North directions, and every solar panel unit comprises the solar panels with same quantity and different orientation;

wherein the energy storage battery assembly comprises one or more battery unit, and every battery unit comprises 2M energy storage batteries and M is an integer larger than 1; two energy storage batteries inside each battery unit are firstly connected in parallel and then connected in series, and battery units are connected in parallel.

* * * * *